Dec. 29, 1953     H. A. BOTTENHORN     2,664,215
MATERIAL HANDLING APPARATUS
Filed Nov. 2, 1950     3 Sheets-Sheet 1
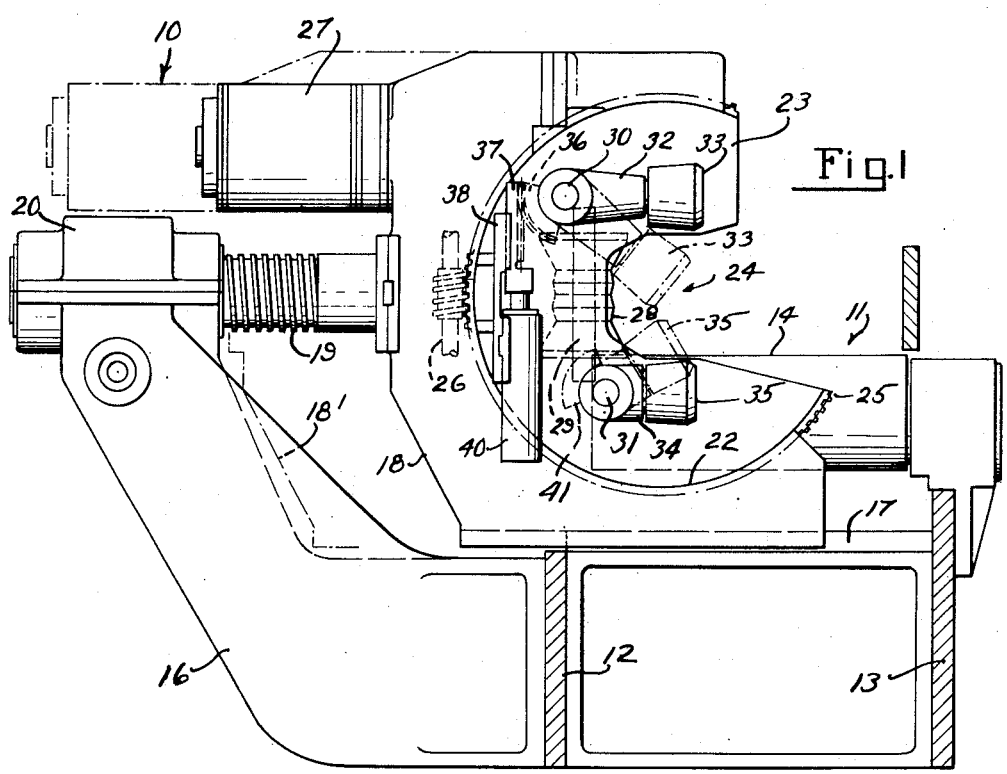
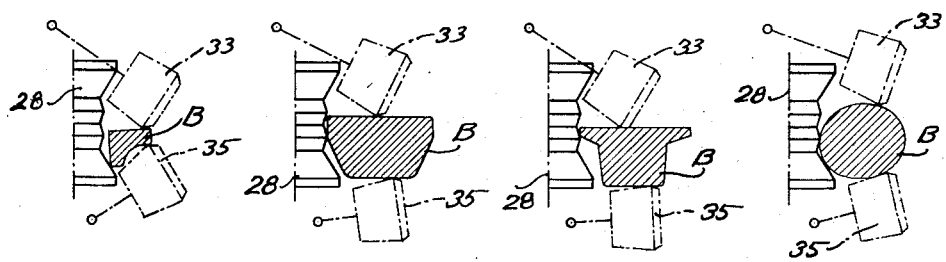
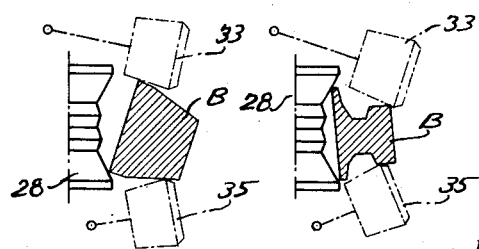
INVENTOR.
HERMANN A. BOTTENHORN
BY
Pollard & Johnston
ATTORNEYS Dec. 29, 1953     H. A. BOTTENHORN     2,664,215
MATERIAL HANDLING APPARATUS
Filed Nov. 2, 1950     3 Sheets-Sheet 2
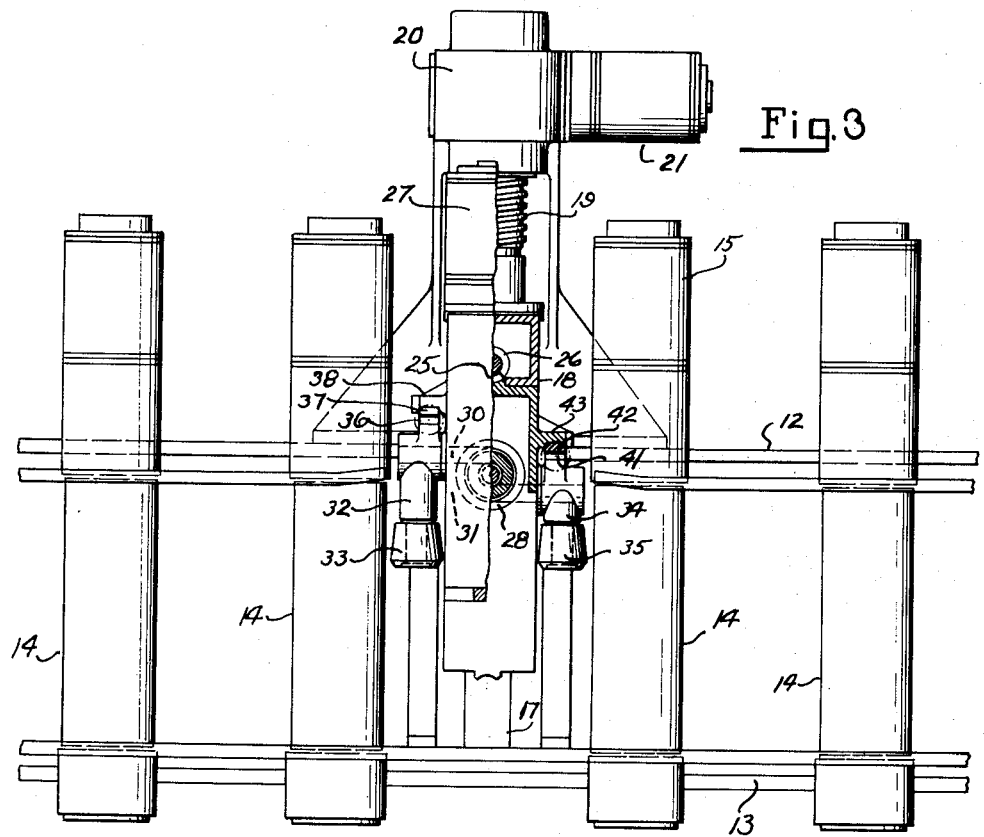
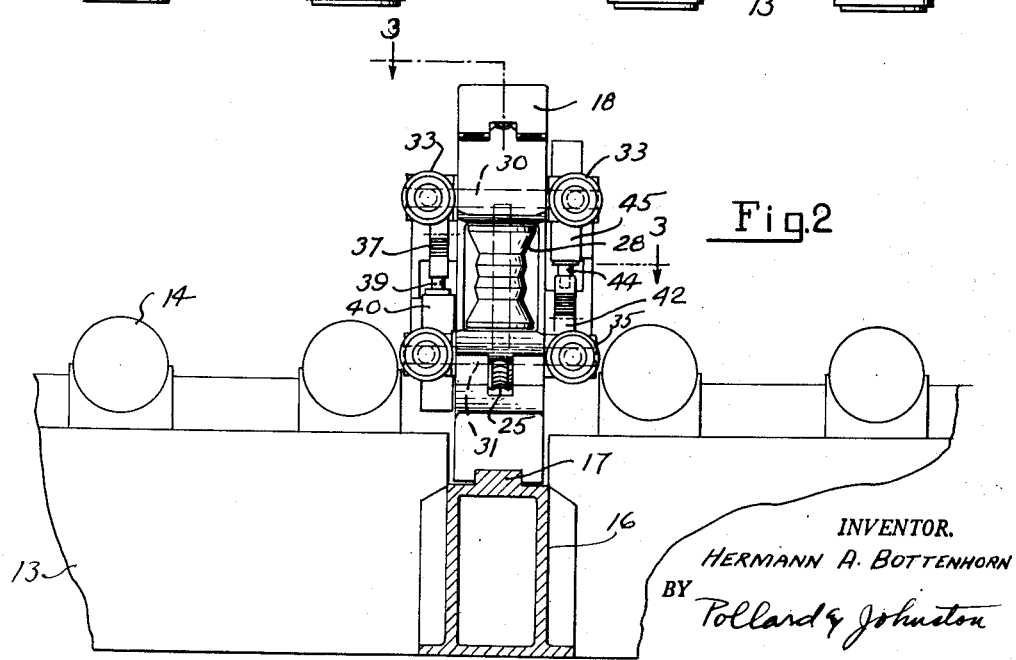
INVENTOR.
HERMANN A. BOTTENHORN
BY Pollard & Johnston
ATTORNEYS

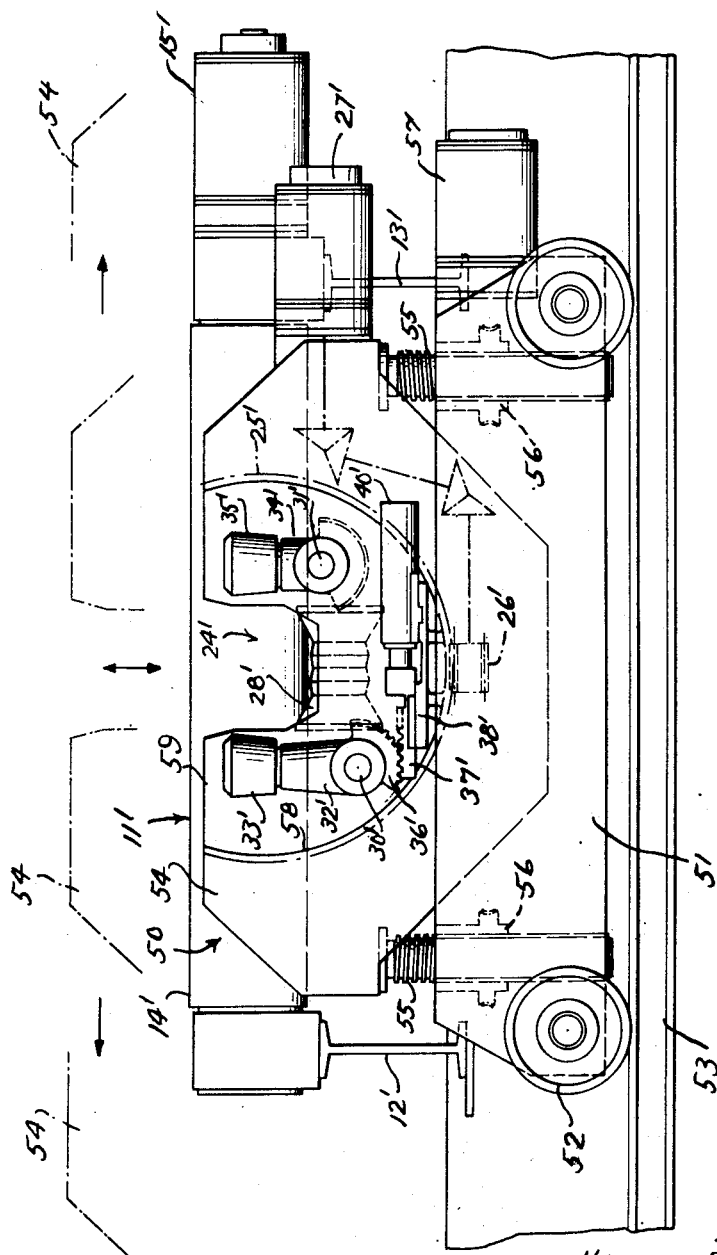

Patented Dec. 29, 1953

2,664,215

UNITED STATES PATENT OFFICE 2,664,215

MATERIAL HANDLING APPARATUS

Hermann A. Bottenhorn, Flushing, N. Y., assignor to Hydropress, Incorporated, New York, N. Y., a corporation of Delaware Application November 2, 1950, Serial No. 193,717

8 Claims. (Cl. 214—1)

The present invention relates to material handling apparatus suitable for use in conjunction with rolling mills and the like, and particularly to such apparatus for turning a rolled, or otherwise shaped, bar around its longitudinal axis before such bar is fed to the next roll stand or point of manipulation.

In conjunction with the usual merchant mill or structural mill practice wherein the roll-stands are arranged side by side, and particularly where bars are being rolled which are other than round in shape, the bar must be rotated a predetermined angle, such as 90°, between passes as well as displaced laterally for alignment with the next roll-stand. The bar is usually in a heated condition at the time it must be turned and laterally displaced so that a difficult handling problem is presented. Automatic devices have previously been proposed for effecting these necessary movements of the rolled bar, however, such devices are limited in the shapes of bars which they are adapted to accommodate and this limitation is a considerable inconvenience when the material handling device is associated with a structural mill capable of producing bars of different irregular cross-sections. Furthermore, when the rolling mill is producing bars of irregular cross-sections, it is necessary, in addition to tilting the bar and moving it laterally into alignment with the next roll-stand, to hold the bar in its tilted position while it is forwarded to such next roll-stand.

Accordingly, an object of the present invention is to provide material handling apparatus of the described character which is effective to tilt and laterally move the bar between successive passes and to hold the bar in tilted position while it is forwarded to the next roll-stand or is returned to the same rolls or pass.

Another object is to provide material handling apparatus of the described character which is adapted to accommodate bars of different irregular cross-sections.

A further object of the invention resides in the provision of material handling apparatus of the described character which is simple and economical in construction and arranged so as not to hinder or interfere with the normal operation of the rolling mill with which it is associated.

According to one aspect of the invention, the above objects are accomplished by providing a laterally movable carriage at a side of the conveyor table of the associated rolling mill, a frame turnably mounted on said carriage and movable laterally with the latter into the path of travel of the rolled bar, the turnable frame being formed with a U-shaped cutout opening at a side thereof to receive the rolled bar, a first gripping roller rotatably mounted in said frame and extending into the cutout thereof, and swingable gripping rollers rotatably mounted on arms pivoted on the turnable frame for swinging movement in lateral planes from positions at the edges of the cutout into the latter and towards a longitudinal plane extending through the axis of rotation of the first gripping roller to engage a rolled bar extending into said cutout and to hold such bar against said first gripping roller. In a preferred embodiment of the invention, the planes of movement of the swingable gripping rollers are spaced longitudinally from a lateral plane extending through the axis of rotation of said first gripping roller so that the range of movement of the swingable rollers will not be limited by the necessary operating mechanism and mounting structure therefor.

According to another aspect of the invention, the carriage is positioned below the roller conveyor table of the associated mill and is mounted for both lateral and vertical movement relative to the latter so that the turnable frame may be normally positioned below the roller conveyor so as not to interfere with the usual operation of the mill and may be moved upwardly into the path of travel of a rolled bar on the conveyor to receive the bar in its cut-out and grip such bar between the swingable and relatively fixed gripping rollers thereon.

In the several forms of the invention, the gripped bar is tilted by rotating the turnable frame and lateral displacement of the gripped bar, between successive passes, is effected by laterally moving the carriage. The bar after tilting can be returned to the same rolls or to the next roll-stand or set of rolls, "successive passes" meaning either. Since the gripping rollers are rotatable, they may continue to hold the bar in its tilted position as the bar is forwarded to the next roll-stand or returned to the same rolls or pass.

These and other objects, features and advantages of the invention will become apparent from the following description and the accompanying drawings which are merely illustrative and form a part hereof.

In the drawings:

Fig. 1 is a front elevational view of a material handling apparatus embodying the present invention and shown associated with the roller conveyor table of a rolling mill or the like;

Fig. 2 is a side elevational view of the apparatus of Fig. 1;

Fig. 3 is a top plan view of the apparatus, partly in section, and taken along the line 3—3 of Fig. 2;

Fig. 4 is a front elevational view of a material handling apparatus constructed according to another embodiment of the invention and shown associated with the roller conveyor table of a rolling mill or the like; and Fig. 5 through Fig. 10, inclusive, are diagrammatic views illustrating the manner in which rolled bars of different irregular cross-sections are held by the gripping elements of material handling apparatus embodying the invention.

Referring to the drawings in detail, and initially in Figs. 1, 2 and 3 thereof, material handling apparatus 10, embodying the present invention is shown associated with a power driven roller conveyor 11 of a rolling mill or the like. Conveyor 11 is of conventional construction and includes longitudinally extending frame members 12 and 13 supporting bearings thereabove within which laterally extending spaced apart conveyor rollers 14 are journalled to be rotated by reversible electric motors 15 (Fig. 3).

The bar being formed in the rolling mill rests upon rollers 14 of the conveyor and is passed longitudinally back and forth between the forming rolls of the roll-stand (not shown) or successive passes until the desired cross-sectional shape is obtained. In forming a bar to other than circular cross-sections, the usual rolling mill practice requires the tilting of the bar about its longitudinal axis after each pass through the forming rolls and the lateral displacement of the bar for alignment with the next roll stand. Further, when the bar is formed with irregular cross-sections, as distinguished from quadrilateral cross-sections, it will not maintain itself in the tilted position on the conveyor and must be continuously held in such tilted position while being forwarded to the next roll-stand.

The material handling apparatus 10 is constructed to perform the above manipulations of a bar on the conveyor 11 between successive passes of the bar through the roll-stand and without interfering with the normal operation of the rolling mill. Apparatus 10 includes a fixed frame 16 extending laterally below the conveyor rollers 14 between frame members 12 and 13 of the conveyor and then upwardly at one side of the latter. Fixed frame 16 is formed with a laterally extending guideway 17 below and between adjacent conveyor rollers 14 to slidably support a laterally movable carriage 18. A screw spindle 19 is fixed to carriage 18 and extends through a casing 20 at the outer end of fixed frame 16. The spindle 19 is moved axially by a conventional mechanism (not shown) which may include a rotatable nut member in casing 20 threaded upon the screw spindle and formed with a worm gear on its outer surface meshing with a worm screw driven by a reversible electric motor 21 (Fig. 3). Thus, the carriage 18 may be displaced laterally between the broken-line position 18' (Fig. 1), at the side of and remote from, conveyor 11, and positions in the path of travel of bars on the conveyor, as for example the full line position of Fig. 1. Carriage 18 is substantially C-shaped (Fig. 1) to define a cutout 22 opening at the side thereof toward the conveyor and having an arcuate edge forming more than one-half the circumference of a circle. The arcuate edge of cutout 22 provides a guideway to slidably receive and guide the arcuate periphery of a turnable frame 23.

Turnable frame 23 is also substantially C-shaped (Fig. 1) to define a cutout 24 opening at a side thereof. Carriage 18 and turnable frame 23 are dimensioned so that cutout 24, in all rotated positions of the turnable frame, provides an opening through which a bar on conveyor roll 14 may extend. In order to rotate frame 23 within the C-shaped carriage 18, frame 23 is provided with a worm gear 25 on its periphery extending into a suitably formed slot in the edge of cutout 22 to mesh with a worm screw 26 rotatable within carriage 18 and driven by a reversible electric motor 27 on the latter through conventional gearing (not shown). Thus, with frame 23 in the rotated position illustrated in Fig. 1, carriage 18 may be moved laterally from its broken line or inoperative position to receive a bar disposed longitudinally on conveyor 11 at the completion of a pass within cutout 24, and when the bar is gripped within frame 23, by mechanism hereinafter described, frame 23 may be rotated within the carriage to tilt the gripped bar the desired angle for the pass through the next roll-stand and the carriage further laterally displaced to align the gripped bar with such next roll-stand.

The mechanism provided for gripping the bar within cutout 24 of the turnable frame includes a substantially spool shaped gripping roller 28 rotatable on a shaft 29, which is fixed relative to frame 23 in a lateral plane, and extending into cutout 24 at the closed end of the latter (Fig. 1). Longitudinally extending shafts 30 and 31 are journalled in frame 23, adjacent the opposite ends of gripping roller 28, and project out of frame 23 at the front and rear thereof. Shafts 30 and 31 are preferably offset in opposite directions relative to the axis of rotation of roller 28. A radially extending arm 32 is fixed to each of the projecting ends of shaft 30 and carries a rotatable gripping roller 33 at its free end. As the shaft 30 is rocked, gripping rollers 33 swing in lateral planes in front of and behind turnable frame 23 from inoperative positions (full lines of Fig. 1) toward the longitudinal plane extending through the axis of roller 28 to operative positions (broken lines of Fig. 1). Similarly, radially extending arms 34 are fixed to the opposite projecting ends of shaft 31 and carry rotatable gripping rollers 35 at their free ends to swing in the planes of movement of the corresponding rollers 33 between inoperative positions (full lines of Fig. 1) and operative positions (broken lines of Fig. 1). Gripping rollers 35, when inoperative and with frame 23 in its starting position, are disposed below the top surfaces of the conveyor rollers 14, and rise above the conveyor rollers in moving to their operative positions to raise the engaged bar from the conveyor rollers so that the bar may be tilted.

One of the arms 32 on shaft 30 is formed integral with a gear segment 36 which meshes with a gear rack 37 slidable linearly in a guide 38 fixed to the front of turnable frame 23 and connected to a fluid pressure operated double acting plunger 39 working in a cylinder 40 also mounted on the turnable frame. Thus, shaft 30 may be rocked by controlling the fluid pressure in cylinder 40 to thereby swing both of the gripping rollers 33 as a unit. Similarly, one of the arms 34, preferably the arm 34 at the opposite side of frame 23 from the segment 36, is formed integral with a gear segment 41 which meshes with a gear rack 42 slidable linearly in a guide 43 fixed to the rear of frame 23 and connected to a double acting, fluid pressure operated plunger 44 working in a cylinder 45 mounted on the rear side of frame 23 so that the positions of gripping rollers 35 may be controlled as a unit through control of the fluid pressure in cylinder 45.

From the above description of the structure forming the gripping elements of the material handling apparatus it is apparent that gripping rollers 33 may be swung toward the longitudinal plane passing through the axis of rotation of gripping roller 28 independent of the swinging movement of gripping rollers 35 so that, as seen in Figs. 5 through 10, inclusive, the gripping rollers 33 and 35 may be operatively positioned in numerous arrangements relative to each other and to the roller 28 to thereby accommodate and firmly grip therebetween bars B having the different irregular cross-sections illustrated.

In operation, carriage 18 is normally disposed at its outermost position leaving clear the surface of conveyor 11 so as not to interfere with the usual operation of the rolling mill. After a bar has completed a pass through the roll-stand, carriage 18 is moved laterally by actuation of motor 21, with the turnable frame angularly positioned so that the cutout 24 thereof opens laterally in the direction of movement, until the bar is disposed within cutout 14. Then the fluid pressures in cylinders 40 and 45 are adjusted to swing gripping rollers 33 and 35, respectively, to positions in which the bar is securely gripped in a triangle of contact between rollers 33, 35 and 28. Electric motor 27, when energized, turns frame 23 so that the gripped bar is tilted the desired angle, and finally carriage 18 is displaced laterally to a position aligning the tilted bar with the next roll-stand. Since all of the gripping rollers are rotatable, they may continue to hold the bar in its tilted position as the bar is forwarded by the rotated conveyor rollers 14 to the next roll stand.

Referring now to Fig. 4, a material handling apparatus 50 is there shown constructed according to another embodiment of the present invention and associated with a conventional power driven roller conveyor 11' of a rolling mill. Conveyor 11' includes the usual longitudinal frame members 12' and 13' supporting bearings in which laterally extending spaced apart conveyor rollers 14' are journalled to be rotated by the driving motors 15'.

Apparatus 50 includes a frame 51 having wheels 52 riding on tracks 53 extending laterally below conveyor 11. A carriage 54 is mounted on frame 51 for vertical movement relative to the latter. In the preferred embodiment, vertical movement of carriage 54 is effected by mechanism including vertical screw spindles 55 fixed to the carriage and extending threadedly through nut members 56 rotatably mounted on frame 51. A reversible electric motor 57 is mounted on frame 51 and drives a worm screw (not shown) which meshes with worm gears formed on the peripheries of nut members 56 to rotate the latter and thus effect vertical movement of spindles 55. Carriage 54 is formed with an upwardly opening cutout 58 having an arcuate edge forming more than one half of the circumference of a circle and providing a guideway for a C-shaped turnable frame 59 similar to turnable frame 23 of the first described embodiment. Frame 59 is formed with a cutout 24', corresponding to the cutout 24, and has mounted thereon swingable gripping rollers 33' and 35' and a relatively fixed roller 28', similar to the correspondingly numbered parts of Figs. 1, 2 and 3, and mounted and actuated in the same manner. A worm gear 25' is formed on the periphery of turnable frame 59 and meshes with a worm 26' journalled in carriage 54 and driven through suitable gearing and shafts by a reversible electric motor 27' also mounted on the carriage.

The structure recited above provides for the vertical movement of turnable frame 59 with carriage 54, in the direction of the vertical arrows of Fig. 4, between an inoperative position (full lines) below the supporting surfaces of the conveyor rollers 14', and operative positions (broken lines) projecting above the conveyor so that a rolled bar on the latter may be received within cutout 24' of the turnable frame. It is also apparent that turnable frame 59 is laterally movable with wheeled frame 51 and is rotatable within carriage 54, while rollers 33' and 35' are independently swingable on the turnable frame from inoperative positions at the sides of cutout 24' (full lines of Fig. 4) towards each other and toward the longitudinal plane extending through the axis of rotation of relatively fixed roller 28' to define various triangles of contact with the latter for accommodating and gripping rolled bars of different irregular cross-sections therebetween as in Figs. 5 through 10, inclusive.

In operating the apparatus of Fig. 4, carriage 54 is normally lowered to a position below conveyor 11' so that it does not interfere with the usual functioning of the associated rolling mill. When a bar has completed a pass through the forming rolls, wheeled frame 51 is moved laterally on tracks 53, either manually or by any suitable mechanical device (not shown) to bring cutout 24' into vertical alignment with the bar. Motor 57 is then energized to rotate nut members 56 and thereby raise screw spindles 55 and carriage 54 until the bar is disposed within the cutout and rests upon gripping roller 28' at the closed end thereof. Gripping rollers 33' and 35' are then swung towards each other to engage the bar, and motor 27' is energized to effect the desired rotation of turnable frame 59 and hence of the bar. Finally, wheeled frame 51 is again moved laterally to bring the tilted bar into longitudinal alignment with the next roll-stand of the rolling mill, and the conveyor rollers are rotated to forward the tilted bar to this next roll-stand while the rotatable rollers 28', 33' and 35' continue to hold the bar in its tilted position.

From the above, it is apparent that the invention provides material handling apparatus, suitable for use with rolling mills forming bars of different irregular cross-sections, and effective to tilt and laterally move the bar between successive passes and to hold the bar in tilted position while it is forwarded to the next roll-stand.

While preferred embodiments of the invention have been illustrated and described in detail, it will be apparent that the new features of construction and combination herein set forth may be embodied in other forms of material handling apparatus, and it is therefore desired that the invention be accorded a scope fully commensurate with its contributions to the art, which are intended to be defined by the appended claims.

What is claimed is:

1. In a material handling apparatus for turning elongated articles about their longitudinal axes; a frame turnable in a lateral plane and having an aperture therein for loosely receiving an article, means for rotating said frame, a gripping roller rotatable on said frame about an axis fixed relative to the latter and disposed in a lateral plane, said gripping roller extending into said aperture, and swingable gripping rollers rotatable about axes in lateral planes and mounted on said frame to swing about longitudinal axes adjacent the opposite ends of the first mentioned roller for movement across said aperture toward said first mentioned roller thereby forming triangles of contact with the latter for turning an article with said frame while permitting longitudinal movement of the article.

2. In a material handling apparatus for turning elongated articles about their longitudinal axes; a frame turnable in a lateral plane and having a cutout therein opening at a side of said frame for loosely receiving an article to be turned, a gripping roller rotatable on said frame about an axis fixed relative to said frame and disposed in a lateral plane, said gripping roller extending into said cutout opposite the open end of the latter, and swingable gripping rollers rotatable about axes disposed in lateral planes and mounted on said frame for swinging movement in lateral planes from positions at the opposite sides of said cutout across the latter and toward a longitudinal plane extending through the axis of the first mentioned roller so that said swingable rollers form triangles of contact with the latter to hold an article for turning with said frame while permitting longitudinal movement of the held article.

3. In a material handling apparatus for turning elongated articles about their longitudinal axes; a frame turnable in a lateral plane and having an aperture therein for loosely receiving a longitudinally extending article, means for rotating said frame, a gripping roller extending into said aperture and rotatable about an axis disposed in a lateral plane and fixed relative to said frame, a longitudinal shaft journalled in said frame adjacent each of the opposite ends of said roller, radial arms extending from said shafts, swingable gripping rollers rotatable on the free ends of said arms, and actuating means for independently rocking each of said shafts to move the related swingable gripping rollers across said aperture and toward a longitudinal plane extending through the axis of the first mentioned roller so that an article in said aperture is held between said gripping rollers to turn with said frame while being longitudinally movable relative to the latter.

4. In a material handling apparatus for turning elongated articles about their longitudinal axes; a frame turnable in a lateral plane and having an aperture therein for loosely receiving a longitudinally extending article, means for rotating said frame, a gripping roller extending into said aperture and rotating about an axis disposed in a lateral plane and fixed relative to said frame, a longitudinal shaft journalled in said frame adjacent each of the opposite ends of said roller, the opposite ends of each of said shafts projecting forwardly and rearwardly of said frame and carrying radial arms each rotatably supporting a swingable gripping roller at its free end for rotation about an axis movable in a lateral plane, and actuating means for independently rocking each of said shafts to swing the related gripping rollers in front and in back of said frame across said aperture and toward a longitudinal plane extending through the axis of rotation of the first mentioned gripping roller so that an article in said aperture is held between said first mentioned roller and said swingable rollers to turn with said frame while being longitudinally movable relative to the latter.

5. In a material handling apparatus for turning elongated articles about their longitudinal axes; a carriage, a substantially C-shaped frame supported at its periphery on said carriage for turning in a lateral plane and defining an aperture opening at one end to loosely receive therein a longitudinally extending article, gear means formed on the periphery of said frame, and driving gear means on said carriage meshing with the first mentioned gear means for rotating said frame, a first gripping roller extending into said aperture at the closed end thereof and rotatable about an axis fixed relative to said frame and disposed in a lateral plane, a longitudinal shaft journalled in said frame adjacent each of the opposite ends of said first gripping roller, radial arms extending from said shafts for swinging movement in lateral planes from positions at the sides of said aperture across the latter and toward a longitudinal plane extending through the axis of said first gripping roller, a swingable gripping roller mounted on the free end of each of said arms for swinging movement with the latter and rotatable about an axis disposed in a lateral plane, a gear segment fixed to each of said shafts, a linearly movable gear rack carried by said frame and meshing with each of said gear segments, and operating means carried by said frame for independently moving each of said gear racks so that said first gripping roller and said swingable gripping rollers are adapted to form different triangles of contact for holding articles within said aperture of different irregular cross-sections to be turned with said frame and free to be moved longitudinally relative to the latter.

6. In combination with a roller conveyor table for forwarding elongated articles and the like; a material handling apparatus for turning elongated articles on said conveyor and for laterally displacing the turned articles comprising a carriage mounted for movement laterally relative to said conveyor, a C-shaped frame supported at its periphery in said carriage and turnable in a lateral plane, said frame defining a central aperture opening at one end to receive therein a longitudinally extending article on said conveyor, gripping means on said frame at the closed end of said aperture, swingable gripping means pivoted on said frame for swinging in lateral planes across said aperture from the opposite sides of the latter toward a longitudinal plane through the first mentioned gripping means so that an article in said aperture is held between said first mentioned gripping means and said swingable gripping means to turn with said frame, actuating means for independently swinging said gripping means pivoted on said frame at the opposite sides of said aperture so that different triangles of contact may be formed between the first mentioned gripping means and said swingable gripping means to accommodate and hold elongated articles of different irregular cross-sections, and means for turning said frame.

7. In combination a roller conveyor for forwarding elongated articles to a rolling mill or the like; and a material handling apparatus for turning elongated articles on said conveyor about their longitudinal axes and for laterally moving the turned articles, said apparatus comprising a fixed frame formed with a guideway extending laterally of said conveyor, a carriage laterally movable on said guideway, a C-shaped frame supported at its periphery in said carriage and turnable in a lateral plane, said turnable frame defining an aperture opening at one end to laterally receive an article on said conveyor, means for moving said carriage laterally to displace said turnable frame between operative positions in the paths of travel of articles on said conveyor and an inoperative position to one side of the latter, a first gripping roller extending into said aperture at the closed end of the latter and rotatable about an axis fixed relative to said turnable frame and disposed in a lateral plane, swingable gripping rollers rotatable about axes disposed in lateral planes and movable independently from inoperative positions at the opposite sides of said aperture across the latter and toward a longitudinal plane extending through said first gripping roller so that said gripping rollers are adapted to form different triangles of contact for holding articles of different irregular cross-sections turnable with said turnable frame and free to be moved longitudinally by said conveyor, and means engageable with the periphery of said turnable frame for turning the latter.

8. In combination, a roller conveyor for forwarding elongated articles to a rolling mill or the like; and a material handling apparatus for turning elongated articles on said conveyor and for laterally displacing the turned articles, said apparatus comprising a guideway extending laterally below said conveyor, a frame mounted on said guideway for lateral movement, a carriage on said frame and vertically movable relative to the latter, a C-shaped turnable frame mounted on said carriage for rotation in a lateral plane and defining an aperture opening at one end, means for vertically moving said carriage to displace said turnable frame between an inoperative position below said conveyor and raised operative positions in the path of said conveyor to vertically receive an article on said conveyor within said aperture, a first gripping roller extending into said aperture at the closed end thereof and rotatable about an axis fixed relative to said turnable frame and disposed in a lateral plane, swingable gripping rollers rotatable about axes disposed in lateral planes and movable independently from inoperative positions at the opposite sides of said aperture across the latter and toward a longitudinal plane extending through the axis of said first gripping roller so that said gripping rollers are adapted to form different triangles of contact to hold articles of different irregular cross-sections turnable with said turnable frame and free to be moved longitudinally by said conveyor, and means for rotating said turnable frame.

HERMANN A. BOTTENHORN.

References Cited in the file of this patent
UNITED STATES PATENTS

| Number | Name | Date |
|---|---|---|
| 363,482 | Price | May 24, 1887 |
| 485,982 | Potter et al. | Nov. 8, 1892 |
| 763,307 | Mills | June 21, 1904 |
| 1,516,205 | Osgood | Nov. 18, 1924 |
| 1,775,851 | Ely | Sept. 16, 1930 |
| 2,010,820 | Larson | Aug. 13, 1935 |
| 2,336,289 | Peterson | Dec. 7, 1943 |
| 2,396,614 | Somes | Mar. 12, 1946 |
| 2,416,815 | Calhoun | Mar. 4, 1947 |
| 2,538,950 | Schryber | Jan. 23, 1951 |